Oct. 18, 1966  R. D. COREY  3,279,455
GAS FIRED RADIANT HEATER
Filed Nov. 16, 1964
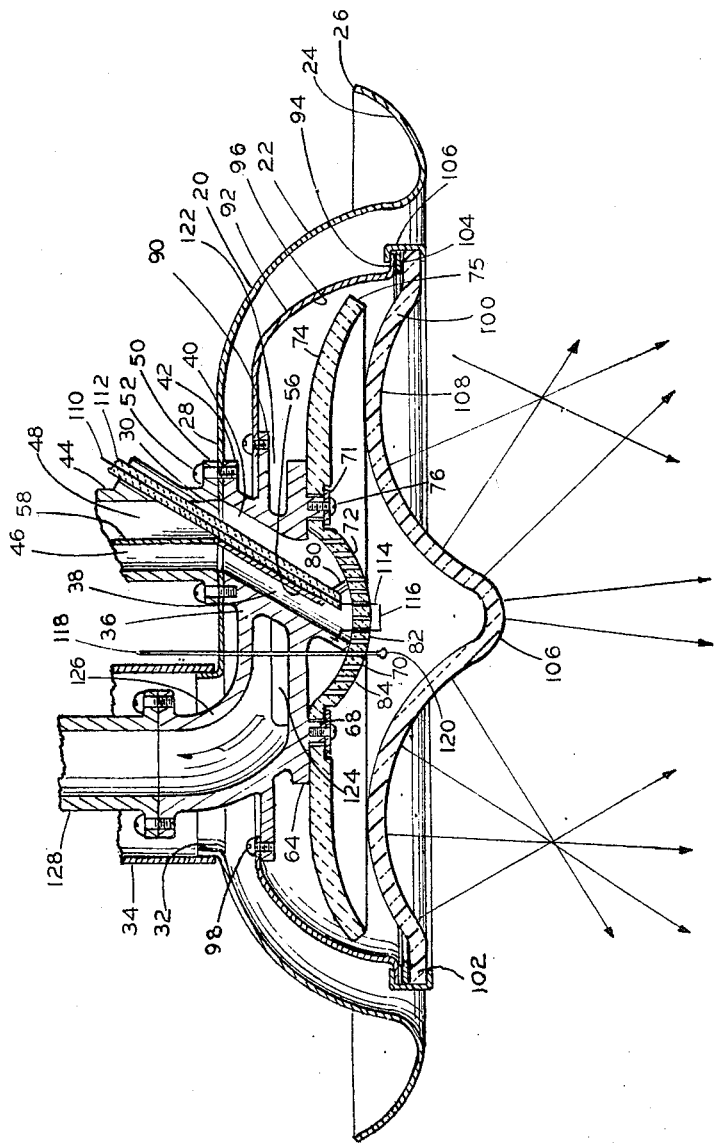
INVENTOR
RONALD D. COREY
BY
ATTORNEY

3,279,455
GAS FIRED RADIANT HEATER
Ronald D. Corey, R.D. 1, Box 293, Chenango Forks, N.Y.
Filed Nov. 16, 1964, Ser. No. 411,358
10 Claims. (Cl. 126—92)

This invention relates to a gas-fired overhead radiant heating fixture, wherein combustion takes place within the fixture.

In room, or space heating it has been common practice to heat the air supplied to the room or space, or to provide radiators within the space, the primary purpose of which is to heat the air within the room. Since hot air rises, the radiators, or the registers by which the heated air is supplied to the space, are generally located adjacent the floor level, unless forced air circulation is employed. The efficiency of such systems depends on the efficiency of a boiler or hot air furnace usually located outside of the space being heated.

The present invention is a departure from such systems, and contemplates heating rooms or space primarily by infra-red radiation emitted by an overhead or ceiling fixture. While the fixture is designed primarily for radiant heat, provision is also made for a fresh air supply to the room or space, deriving heat solely from the waste heat contained in the exhaust gases of the fixture. More particularly the invention contemplates the burning of a completely combustible gas and air mixture in a closed chamber within a ceiling fixture, the combustion taking place beneath a ceramic burner grid centrally disposed within the fixture. Furthermore, the invention is directed to the employment in the fixture of a radiant plate disposed beneath the burner grid in such relation to the grid as to be heated thereby, the plate being so contoured as to provide radiation to the space below over a relatively wide area, and with substantially uniform intensity.

Additionally the fixture is provided with labyrinth passages for the burning or burnt gases, and the conduction of said gases to an exhaust conduit the latter being adapted to be surrounded by the fresh air inlet duct. The fresh air inlet duct opens into an annular passage surrounding the burner, and formed by the outer mounting shell of the fixture and the surrounded burner and radiant parts thereof.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Referring to the drawing, which is a sectional view of the burner, there is shown an outer shell or mounting box 20 of sheet metal or other suitable material. The box is circular, and comprises a central inverted saucer like portion 22, adapted to project up into a ceiling aperture, and an external integral flange portion 24, the outer circular edge 26 of which is adapted to engage against the marginal edge of the ceiling aperture. The portion 22 has a relatively flat circular center section 28 having an off center aperture 30, and having a flanged opening 32 adapted for connection to a fresh-air inlet pipe 34.

Supported from the flat section 28 of shell 20, is a casting 36, having separate passageways 38 and 40 for separate combustible gas and air mixture supplies. The casting is provided with a mounting flange 42 adapted to be secured to the underside of the flat portion 28 of the shell 20. A gas mixture supply pipe 44, having separate conduits 46 and 48 aligned with and connected to the passageways 38 and 40 respectively may be secured to the outside of the shell, by a mounting flange or lugs 50, and common fastening means 52 may be employed to clamp the flanges 42 and 50 on opposite sides of the shell. The aperture 30 in the shell is in alignment with the passageways 38 and 40. If a single circular opening is provided, the dividing wall 56 of the casting 36, or the dividing wall 58 of the pipe 44 will be extended slightly by the thickness of the shell 20 so as to meet and form two continuous and separate passages for combustible gas mixtures.

The casting 36 is provided with a circular flange or plate 64 having a circular annular ridge 68. A circular ceramic closure plate 70, shown as of dome shape, and having a multiplicity of fine apertures 72, is fitted against the flange 64 within the annular ridge 68, and an annular refractory disk 74 is supported against the flange 64, outwardly of the annular ridge 68. An annular member 71, secured to the ridge as by screws 76 may hold the ceramic plate 70, and refractory disk 74 in position against the flange or plate 64.

The combustible gas mixture passages 38 and 40 are extended to the inner face of the ceramic plate 70 as by a conical extension 80 of the passage 38, the lower annular edge of which contacts the ceramic plate 70, and embraces a central circular portion 82 thereof. The passage 40 is thereby caused to terminate at the inner surface of the ceramic plate 70 over an annular area 84 disposed outside of the conical extension 80, and the circular portion 82.

Secured upon a flange 90 integral with the casting 36, is an annular shell 92, having a circular peripheral flange 94. The flange 90 may be oval, and the shell 92 is secured thereto as by screws 98, the shell having an aperture small enough to provide a continuous overlap and gas tight connection to the flange 90. The flange 94 supports a radiant disk 100, of Pyrex or stress relieved glass or the like or porcelainized metal, decoratively finished, such disk having a circular outer edge portion 102 that seats against an annular gasket 104. The disk 100 is held in position by an annular inwardly facing channel ring 106, which may be split for assembly in any suitable manner, as will be understood in the art. The radiant disk will preferably have a central dome-like convex surface 106 of small radius, to cause diverging radiation from the outer surface thereof, and a surrounding annular concave surface 108, whic may be toroidal, that will provide a preponderance of divergent radiation, it being the purpose of the shape of the disk to provide radiation over a substantial area, that will be reasonably uniform, and free of hot spots.

An ignition wire 110, encased in an insulating sleeve 112 may extend through the passageway 40, and have a fine point 114 projecting well into one of the apertures 72 of the ceramic plate 70. A second fine wire 116, mounted in and grounded in the wall of the passageway 38 may extend through another aperture of the ceramic plate 70, the wire having a lateral extension terminating close to the point 114 to provide an ignition spark gap. A fine capillary tube 118, having a bulb 120 suitably disposed below the ceramic plate 70 may be provided, the same being the usual sensory portion of a thermal device for opening the ignition circuit to interrupt ignition, and, simultaneously, close the high flame gas valve control circuit for opening said high flame gas and air valves, after ignition has taken place in portion 82 of ceramic plate 70. The casting 36 has in effect a circumferential passageway 122 disposed between the flanges 64 and 90, which connects as by an opening 124 with an exhaust elbow 126, leading into the approximate center of the fresh air inlet opening 32, the elbow being adapted to be coupled to an exhaust pipe 128 extending centrally along and within the fresh air inlet duct 34, for such length as may be desired to obtain heat exchange to the incoming fresh air from the hot gases in the exhaust pipe 128.

It will be seen that the casting thus comprises a lower circular plate through which the separate combustion gas mixture passages 38 and 40 intersect passage 122, and an upper flange, embracing the exhaust pipe elbow and the upper portions of the combustion gas passages 38 and 40.

The marginal edge 75 of the refractory disk 74 is spaced from the wall 96 of the shell 94 to provide an annular passage therearound. The gas and air mixture passages 38 and 40 provide a low flame or pilot gas mixture supply and a high flame or main gas mixture supply respectively, and may lead to a control valve such as is shown in U.S. Patent #3,115,302. The exhaust pipe 128 is connected to an exhaust blower as referred to in said patent, which is adapted to maintain a subatmospheric pressure within the burner and exhaust duct of ½" to 4", water column, whenever flame is to be maintained within passages 72 of ceramic plate 70.

The supply of combustible gas mixture to the burner is dependent upon the establishment, and maintenance of a subatmospheric pressure in the exhaust pipe 128. When such subatmospheric pressure exits, the low flame gas valve (pilot) will be opened by a means responsive to the subatmospheric pressure present in the burner and combustion chamber, and thus a combustible gas-air mixture will flow through passage 38 to portion 82 of ceramic plate 70 and will be ignited by spark ignition at the spark gap. Once ignited, the gases will burn within passages 72 causing the portion 82 of ceramic plate 70 to glow on the bottom side (outlet for the combusted gases) which results in the sensor 120 cutting off the spark. In this manner a limited amount of radiant heat will be projected upon the radiating disk 100 as long as the pilot or low flame is sustained by the subatmospheric pressure within the burner and combustion chamber. When a high flame and full radiant heat is desired air and gas mixture is also drawn into the burner through passageway 40. Such gas mixture will be ignited by the pilot or low flame, and the entire under surface of the ceramic plate 70, will then become incandescent.

It will be seen that the combustible gas and air mixture will be drawn into the burner, either through passageway 38, alone or passageways 38 and 40 together. The gas mixture burning on the underside of the ceramic plate 70 will render the central portion or the entire under surface thereof incandescent. The burned gases will travel radially outward from the ceramic plate 70, heating the refractory disk 74, as well as the radiant plate 100. The gases thereafter travel around the outer edge 75 of the refractory disk 74, and radially inward over the back side thereof, and thence to the exhaust elbow 126, the exhaust pipe 128, and to the vacuum exhaust pump. Subatmospheric pressure within the combustion chamber and burner is essential to draw the combustible gas and air mixture into the burner through passageway 38, or passageways 38 and 40 together.

Fresh air entering through air inlet pipe 34 is heated from exhaust gases passing through the exhaust pipe 116, and is further heated as it passes down around the outside surface of the shell 92. The outside air maintains the mounting box or shell 20 relatively cool.

In practice the perforate plate 70 may be either flat or dome shaped, and will be provided with uniformly spaced apertures, of a diameter in the order of 1/16 inch, and the spacing of such apertures may be such as to provide a combined aperture area equivalent to at least 20 percent of the plate surface area and preferably a much higher percentage. It will be understood that the gas and air mixture in passing through the apertures 72 of the inner surface of the ceramic plate 70 has a cooling effect such that while the burning gases burn midway through apertures 72 causing the bottom or outlet side of the ceramic plate 70 to glow to incandescence, the upper side of the plate is maintained at a temperature insufficient to ignite the oncoming gas and air mixture, by reason of poor heat conductance of the ceramic plate and the cooling effect of the air and gas mixture passing through the apertures 72.

The incandescent face of the perforate ceramic plate 70 which glows at temperatures in the order of 1000° to 2000° F., and the radiant heat from the surrounding refractory disk 74, heats the center or hub portion 106 of radiating disk 100 by infrared, to higher temperatures than section 108 of radiating disk 100 which is heated by passing hot combustion gases between refractory disk 74 and radiating disk 100, as they move toward the periphery of refractory disk 74 in route to the exhaust exit 126. The ceramic plate 70 when heated to incandescence, heats the hub portion 106 of radiating disk 100 to temperatures up to 800° F. by infrared projection, while the portion 108 of radiating disk 100 is cooler because of its heat source being the remaining temperature present in the combusted gases moving outwardly to the periphery of the radiating disk 100 and refractory disk 74. The hub portion 106 being circular and convex in shape, projects the highest temperature (shorter) wave lengths outwardly, down to the walls of the room at the floor area for dilution of their intensity which heats objects in their path. The cooler portion 108 of radiating disk 100 projects the longer cooler wave lengths downwardly to the floor, and due to the concave shape of portion 108 of radiating disk 100, the infrared pattern is spread over a wide area to reduce hot spots and accomplish a uniform comfort temperature in the occupied area of the space being heated.

One or more ceiling fixtures of the type described are adapted to have their exhaust ducts 128 connected to a common exhaust manifold, if desired, which in turn is held at subatmospheric pressure by a single exhaust pump or blower. Each ceiling fixture is adapted to be used in conjunction with a separate control, which allows an air and gas mixture to flow into passage 38, whenever a space thermostat calls for heat in the space, and a subatmospheric pressure exists in the burner and fixture. The control will also allow a combustible air and gas mixture to flow into passage 40 for high flame operation whenever subatmospheric pressure exists within the burner, and the low flame burner is already operating, and a room temperature responsive device or the equivalent calls for high flame.

The control will also include ignition means to provide a spark, whenever the burner is cold and subatmospheric pressure within the burner is present by reason of exhaust blower operation, the electrical energy for the spark being preferably made available when a subatmospheric pressure exists in the burner. Upon low flame ignition, the flame sensor cuts off the spark and conditions the high flame gas supply for high flame operation, upon the call for such operation by the room temperature responsive device.

Each control may be like that shown in U.S. Patent 3,115,302, where separate pilot and main gas supply valves are shown, the control however being modified by having additional provision whereby gas and air mixture will be allowed to be drawn into passage 40 for high flame operation, only when a room temperature responsive device associated with the space served by the fixture indicates high flame in such fixture is desired. To accomplish this purpose, an additional atmospheric passage, similar to passage 58 (see 3,115,302) may be provided, together with thermostatic means to close the passage when acting in response to the room temperature responsive device calling for high flame operation, or other equivalent means may be provided.

From the foregoing it will appear that as many radiant heating fixtures, each with a suitable control, may be connected to a common exhaust turbine, the slippage of which will maintain the pressure within the exhaust pipes from the respective fixtures at a subatmospheric pressure of about ½ to 4 inches water gage. All fixtures when subjected to vacuum will have their pilot or low flames ignited, and each fixture, or groups of fixtures if desired, may be separately controlled by room thermostats for high flame operation. It will be seen that by supplying fresh air to each of the fixtures through the duct 34, the fixture shell 22 is kept cool, and such fresh air supply becomes heated from the waste heat of the fixture and its exhaust pipe. Thus the fixtures operate at high efficiency, and provide radiant heat, which permits employment of lower air temperatures in the space affected.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A gas fired radiant heater comprising a mounting box in the form of a shell, a gas mixture supply conduit extending through said shell, a perforate ceramic plate disposed within the shell and closing the end of said conduit and having a face rendered incandescent upon the burning of gas thereover supplied through the plate, an annular refractory disk disposed around said ceramic plate substantially coplanar therewith, means forming an enclosure for said ceramic plate and refractory disk, and comprising a radiating disk disposed in spaced relation from the face of said ceramic plate and refractory disk, said enclosure means being disposed within said shell, and in spaced relation therefrom, exhaust conduit means extending through said shell and connected to said enclosure means for exhausting burned gases from said enclosure means, and a fresh air supply conduit surrounding said exhaust conduit means and leading into said shell and adapted to discharge fresh air around said enclosure means.

2. A gas fired radiant heater comprising a mounting box in the form of a shell, a gas mixture supply means extending through said shell having two separate supply conduits, one terminating concentrically within the other, a perforate ceramic plate disposed within the shell and closing the ends of both of said conduits and having a face rendered incandescent upon the burning of a gas mixture thereover supplied through the plate from one or both of said conduits, an annular refractory disk disposed around said ceramic plate substantially coplanar therewith, means forming an enclosure for said ceramic plate and refractory disk, and comprising a radiating disk disposed in spaced relation from the face of said ceramic plate and refractory disk, said enclosure means being disposed within said shell, and in spaced relation therefrom, exhaust conduit means extending through said shell and connected to said enclosure means for exhausting burned gases from said enclosure means, and a fresh air supply conduit surrounding said exhaust conduit means and leading into said shell and adapted to discharge fresh air around said enclosure means.

3. A gas fired radinat heater comprising a mounting box in the form of a shell, gas mixture supply means extending through said shell having a low fire and a high fire conduit, the former terminating concentrically within the latter, a perforate ceramic plate disposed within the shell and closing the ends of both of said conduits and having a face rendered incandescent upon the burning of a gas mixture thereover supplied through the plate from the low fire conduit, or both conduits, an annular refractory disk disposed around said ceramic plate substantially coplanar therewith, means forming an enclosure for said ceramic plate and refractory disk, and comprising a radiating disk disposed in spaced relation from the face of said ceramic plate and refractory disk, said enclosure means being disposed within said shell, and in spaced relation therefrom, exhaust conduit means extending through said shell and connected to said enclosure means for exhausting burned gases from said enclosure means, and a fresh air supply conduit surrounding said exhaust conduit means and leading into said shell and adapted to discharge fresh air around said enclosure means.

4. A gas fired radiant heater comprising a gas mixture supply means having a low fire and a high fire conduit, the former terminating within and surrounded by the latter, a perforate ceramic plate closing the ends of both of said conduits and having a face rendered incandescent upon the burning of a gas mixture thereover supplied through the plate from the low fire conduit, or both conduits, an annular refractory disk disposed around said ceramic plate substantially coplanar therewith, and means forming an enclosure for said ceramic plate and refractory disk and having an exhaust port and comprising a radiating disk disposed in spaced relation from the face of said ceramic plate and refractory disk.

5. A gas fired radiant heater comprising a gas mixture supply means having a low fire and a high fire conduit, the former terminating within and surrounded by the latter, a perforate ceramic plate closing the ends of both of said conduits and having a face rendered incandescent upon the burning of a gas mixture thereover supplied through the plate from the low fire conduit, or both conduits and means forming an enclosure for said ceramic plate and having an exhaust port and comprising a radiating disk disposed in spaced relation from the face of said ceramic plate.

6. A heater in accordance with claim 1 wherein the radiating disk is of stress relieved glass, and has a convex central radiating surface, and an annular concave surrounding radiating surface.

7. A heater in accordance with claim 2 wherein the radiating disk is of stress relieved glass, and has a convex central radiating surface, and an anular concave surrounding radiating surface.

8. A heater in accordance with claim 3 wherein the radiating disk is of stress relieved glass, and has a convex central radiating surface, and an annular concave surrounding radiating surface.

9. A heater in accordance with claim 4 wherein the radiating disk is of stress relieved glass, and has a convex central radiating surface, and an annular concave surrounding radiating surface.

10. A heater in accordance with claim 5 wherein the radiating disk is of stress relieved glass, and has a convex central radiating surface, and an annular concave surrounding radiating surface.

References Cited by the Examiner

UNITED STATES PATENTS

| | | |
|---|---|---|
| 1,571,785 | 2/1926 | Belvin. |
| 2,517,398 | 8/1950 | McCollum. |
| 2,838,042 | 6/1958 | Tze-Ning Chen _____ 126—110 |
| 2,843,108 | 7/1958 | Campbell et al. _____ 126—110 |
| 3,027,936 | 4/1962 | Lamp _____ 158—105 |
| 3,077,922 | 2/1963 | Soucie _____ 158—105 |

FOREIGN PATENTS 559,179   3/1957   Italy.

FREDERICK KETTERER, *Primary Examiner.*